Figure 1:
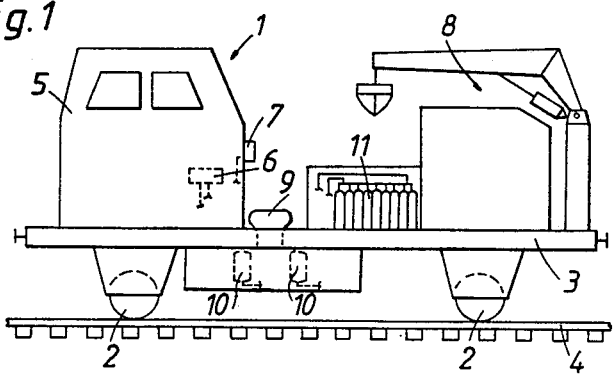

United States Patent [19]

Theurer et al.

[11] Patent Number: 4,718,352
[45] Date of Patent: Jan. 12, 1988

[54] RESCUE VEHICLE WITH EMERGENCY ENGINE ACTUATION

[75] Inventors: Josef Theurer, Vienna; Leopold R. Gruber, Scheibbs, both of Austria

[73] Assignee: Franz Plasser Bahnbaumaschinen Industrie-Gesellschaft m.b.H., Vienna, Austria

[21] Appl. No.: 837,952

[22] Filed: Mar. 10, 1986

[30] Foreign Application Priority Data

Mar. 18, 1985 [AT] Austria ............................... 806/85

[51] Int. Cl.⁴ ........................... B61C 5/02; B61D 15/00
[52] U.S. Cl. ....................................... 105/62.1; 431/76; 123/567
[58] Field of Search ................. 105/62.1, 65; 123/522, 123/531, 543, 546, 567; 114/337; 431/76

[56] References Cited

U.S. PATENT DOCUMENTS

| | | | |
|---|---|---|---|
| 2,034,585 | 3/1936 | Lipetz | 105/62.1 |
| 3,354,872 | 11/1967 | Gratzmuller | 123/543 X |
| 3,395,681 | 8/1968 | Walker | 123/522 |
| 3,702,110 | 11/1972 | Hoffman et al. | 123/567 X |
| 3,774,391 | 11/1973 | Puttick | 123/567 X |
| 3,775,976 | 12/1973 | Karig | 123/543 X |
| 3,800,768 | 4/1974 | Rhodes et al. | 123/522 |
| 4,011,847 | 3/1977 | Fortino | 123/522 |
| 4,372,280 | 2/1983 | Adams | 123/522 X |
| 4,482,311 | 11/1984 | Wada et al. | 431/76 X |

FOREIGN PATENT DOCUMENTS

| | | |
|---|---|---|
| 666580 | 10/1938 | Fed. Rep. of Germany . |
| 852921 | 10/1952 | Fed. Rep. of Germany ...... 123/567 |
| 2834347 | 3/1980 | Fed. Rep. of Germany . |
| 49369 | 5/1909 | Switzerland . |
| 79126 | 10/1918 | Switzerland . |

*Primary Examiner*—Robert B. Reeves
*Assistant Examiner*—Scott H. Werny
*Attorney, Agent, or Firm*—Kurt Kelman

[57] ABSTRACT

A rescue vehicle adapted for driving in tunnels, mines or at oxygen-poor high altitudes comprises a Diesel engine, a first conduit connected to the engine for supplying ambient air to the engine, bottles of compressed air carried on the vehicle, a second conduit connecting the bottles of compressed air to the engine for supplying the air to the engine, and a switching arrangement for selectively interrupting the flow of the ambient air from the first conduit to the engine when the air is supplied to the engine through the second conduit and for interrupting the flow of air through the second conduit to the engine when the ambient air flows to the engine through the first conduit.

7 Claims, 2 Drawing Figures

RESCUE VEHICLE WITH EMERGENCY ENGINE ACTUATION

The present invention relates to a work vehicle adapted for driving in an atmosphere having a low oxygen-containing gas content, which comprises an internal combustion engine, such as a Diesel motor, for driving the vehicle, the engine burning a fuel in admixture with an oxygen-containing gas injected thereinto. The vehicle may be adapted for mobility along a track and for rescue work in underground track sections not readily accessible to a normal ambiance of air, such as tunnels, mines or high altitudes, capable of carrying rescue personnel and equipped with rescue apparatus, including, for example, a crane.

Internal combustion engines dependent on sucking in ambient air for burning fuel cannot be operated in the absence of a predetermined minimum level of oxygen, wherefore such vehicles cannot be driven under emergency conditions in areas which are not accessible to a normal atmosphere, such as tunnels and mines, or at the scene of a railroad accident involving fires or the development of noxious gases. If injured persons are to be rescued by the vehicle and carried by it from the scene of the accident, it is disadvantageous to use a vehicle with such an internal combustion engine since the operation of the driving engine would use up precious ambient air, which often is already fouled by smoke, needed by the injured persons to enable them to breathe.

German patent No. 2,834,347, published Mar. 13, 1980, discloses an air suction system for an emergency internal combustion engine ignition, which comprises two air suction conduits for the combustion air passing horizontally through the wall of the structure housing the engine ignition. Fire protection flaps are arranged in each air suction conduit and these flaps are automatically closed in response to the temperature of the sucked-in combustion air. To assure an adequate supply of usable combustion air, the two fire protection flaps are so controlled that only the flap in that air suction conduit is closed through which the hotter air flows when the predetermined minimum temperature of the supplied air is exceeded. This system is stationary and cannot be used in a mobile vehicle in tunnels, mines and like environments.

Swiss patent No. 49,369, dated May 13, 1909, discloses a vehicle comprising an internal combustion engine driving the vehicle and an auxiliary motor producing compressed air supplied to the engine for its operation. The driving engine also drives an air pump supplying sufficient air to the engine for average driving speeds so that the auxiliary motor needs to supply air only when the engine is operated above or below the average driving speed. The air pump delivers the compressed air generated thereby into a collection vessel whence it is delivered through a control valve to the engine.

German patent No. 666,580, published Oct. 22, 1938, discloses a Diesel engine locomotive carrying bottles of compressed air and comprising a control system for delivering the compressed air to the engine for starting the same.

Swiss patent No. 79,126, published Oct. 1, 1918, discloses a locomotive driven by a cylinder-piston engine operated with compressed air supplied to the engine by air pumps on the locomotive.

It is the primary object of this invention to provide a work vehicle of the first-described type whose internal combustion engine may be operated under emergency conditions in which insufficient oxygen is available for engine operation from the ambient atmosphere.

The above and other objects are accomplished according to the invention in such a work vehicle, which comprises a first conduit means connected to the engine for supplying ambient oxygen-containing gas to the engine, a supply of compressed oxygen-containing gas carried on the vehicle, and a second conduit means connecting the supply of compressed oxygen-containing gas to the engine for supplying the oxygen-containing gas from the supply to the engine. Switching means selectively interrupts the flow of the ambient oxygen-containing gas from the first conduit means to the engine when the oxygen-containing gas is supplied to the engine through the second conduit means and interrupts the flow of oxygen-containing gas through the second conduit means to the engine when the ambient oxygen-containing gas flows to the engine through the first conduit means.

Since the vehicle carries an emergency supply of oxygen-containing gas for operation of the engine, the vehicle may be used under adverse conditions because the engine may be operated in an atmosphere poor in oxygen or even in the absence of oxygen. This is of particular advantage when rescue operations are to be undertaken in catastrophies occurring in locations which are hard to air, such as in tunnels or mines, when such rescue apparatus as cranes, hoists, jacks or winches carried on the vehicle remain fully operative. Furthermore, the arrangement according to the present invention may be readily retrofitted on existing work vehicles since the internal combustion engine driving the vehicle need not be changed but the added conduit and switching means may be readily added to the existing air suction conduit for emergency connection to a supply of compressed air. The switching means may be actuated instantly without loss of time. This has the advantage that the driving engine of the vehicle may be operated on its way to the emergency location with the ambient air and without using up the supply of compressed air while the latter is switched on without interrupting the advance of the vehicle when the ambient atmosphere no longer contains sufficient oxygen for operation of the engine.

Figure 2:
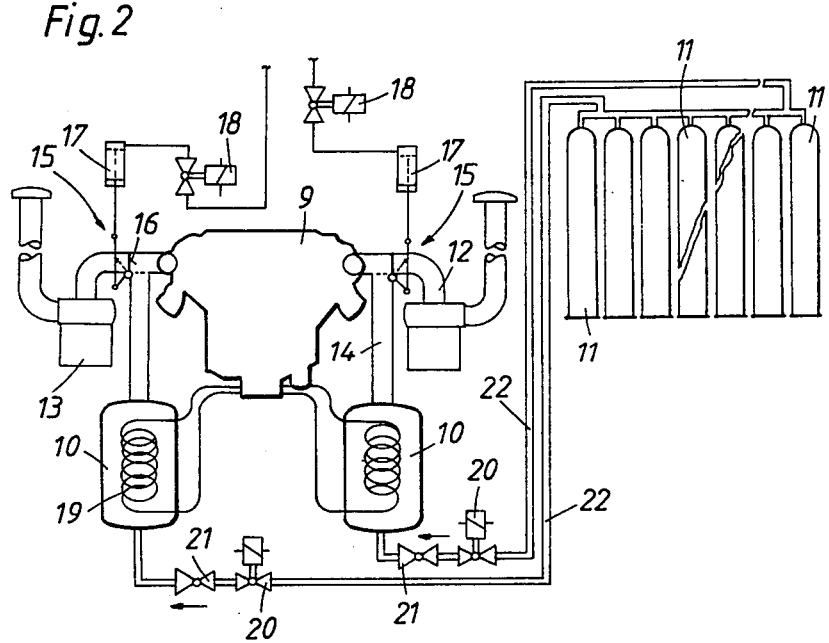

The above and other objects, advantages and features of this invention will become more apparent from the following detailed description of a now preferred embodiment thereof, taken in conjunction with the accompanying schematic drawing wherein FIG. 1 is a side elevational view of a work vehicle and FIG. 2 is a highly simplified diagrammatic view of the alternate system for supplying air to the driving engine of the vehcile.

Referring now to the drawing and first to FIG. 1, there is shown work vehicle 1 which comprises frame 3 supported on undercarriages 2, 2 for mobility along track 4. The illustrated work vehicle is adapted for rescue work in underground track sections not readily accessible to a normal ambiance of air, and the vehicle is capable of carrying rescue personnel and is equipped with rescue apparatus 8, thus being useful as a tunnel rescue vehicle, for example. Such a vehicle is used for rapid access to injured passengers of a train accident in a tunnel, for instance, where it is undesirable further to reduce the oxygen content of the air by the operation of the vehicle driving engine to a level endangering the lives of the passengers or the rescue personnel.

As shown, vehicle frame or chassis 3 carries an operator's cab 5 containing central control panel 6 at one end and rescue apparatus 8 at the opposite end, the illustrated rescue apparatus including a crane or hoist. Internal combustion engine 9 for driving vehicle 1 is mounted on frame or chassis 3 between cab 5 and rescue apparatus 8. The engine burns a fuel in admixture with an oxygen-containing gas, such as air, injected thereinto, and is illustrated diagrammatically as a Diesel motor comprising two storage cylinders 10 for fuel, i.e. Diesel oil, heating coil 19 being arranged in each storage cylinder.

First conduit means 12 is connected to the engine for supplying ambient oxygen-containing gas, i.e. air, to the engine, a supply of compressed oxygen-containing gas comprised of a plurality of bottles 11 containing compressed air under a pressure of about 200 bars is carried on vehicle 1 on frame 3 between rescue apparatus 8 and engine 9, and second conduit means 22, 14 connects the supply of compressed oxygen-containing gas to the engine for supplying the oxygen-containing gas from the supply to the engine. In the illustrated embodiment, the first conduit means comprises a twin suction conduit 12, 12 leading to the combustion chamber of engine 9 at opposite sides thereof for sucking ambient combustion air through combustion air filters 13, 13 into the combustion chamber from the ambient atmosphere under normal operating conditions. The second conduit means comprises respective connecting conduit 14, 14 leading from a respective fuel storage cylinder 10 to the suction conduit, and respective pressure conduit 22, 22 connecting supply 11 of compressed oxygen-containing gas to a respective storage cylinder. A gas pressure reducing valve 21 is arranged in each pressure conduit 22.

According to this invention, switching means 15, 20 is arranged for selectively interrupting the flow of the ambient oxygen-containing gas from suction conduit 12 to the engine when the oxygen-containing gas is supplied to the engine through second conduit means 22, 14 and for interrupting the flow of oxygen-containing gas through the second conduit means to the engine when the ambient oxygen-containing gas flows to the engine through the suction conduit. In the illustrated embodiment, the switching means comprises solenoid shut-off valve 20 in each pressure conduit 22 for interrupting the flow of the oxygen-containing gas from the pressure conduit to the fuel storage cylinder and control arrangement 15 including a respective flap valve 16 in the twin suction conduit. The flap valve is pivotal between positions respectively permitting and interrupting the flow of the ambient oxygen-containing gas to the engine, as indicated by broken and full lines, respectively, in FIG. 2. The control arrangement further includes cylinder-piston device 17 connected to each flap valve 16 for pivoting the flap valve and solenoid valve 18 for operating the cylinder-piston device.

The arrangement of the pressure reducing valve in each pressure conduit makes it possible simply and readily to reduce the pressure of the oxygen-containing gas flowing into the fuel storage cylinders from the supply of compressed oxygen-containing gas to atmospheric pressure so that it may be sucked into the combustion chamber of engine 9 without interfering with the operation after control arrangement 15 is operated to shut off access of the ambient atmosphere to the engine. The heating coils in fuel storage cylinders 10 prevent supercooling of the suddenly decompressed oxygen-containing gas. Control arrangement 15 with its pivotal flap valve 16 makes remote control of the switching from ambient air to the compressed air supply readily possible without requiring any modification of the engine.

As shown in FIG. 1, instrument 7 for measuring the oxygen content of the atmosphere surrounding vehicle 1 is mounted on the outside of operator's cab 5. The instrument emits a switching control signal indicating a predetermined minimum oxygen content necessary for proper operation of engine 9. This control signal operates solenoid valves 18 and 20 for interrupting the gas flow to the engine from twin suction conduit 12, 12 and permits the gas flow to the engine from pressure conduits 22, 22 through connecting conduits 14, 14. This will automatically control the switching of the air supply to the engine so that the operating personnel of the vehicle may concentrate completely on the rescue operation. Furthermore, this automatic control set to respond to a predetermined minimum oxygen level in the ambient atmosphere will automatically delay connection to the supply of compressed air to the last possible moment as long as there is enough oxygen in the atmosphere to allow engine operation so that the supply will be preserved as long as possible.

The operation of vehicle 1 will partly be obvious from the above description of the structure thereof and will be described in further detail hereinbelow.

Under normal operating conditions, ambient air is sucked through twin suction conduit 12, 12 and air filters 13, 13 into the combustion chamber of engine 9, cylinder-piston devices 17 in control arrangement 15 having been actuated by solenoid valves 18 into the position shown in broken lines in FIG. 2, wherein air flow is permitted from twin suction conduit 12 into the engine combustion chamber while no air can flow out of connecting conduits 14, 14 into the engine combustion chamber. When oxygen-content measuring instrument 7 emits a control signal to indicate that the oxygen content in the ambient atmosphere has fallen below a predetermined level, the control signal is transmitted to solenoid valves 18 and 20 to operate these valves, causing flap valves 16 to be pivoted into the position shown in full lines in FIG. 2 for interrupting the air flow to the engine from twin suction conduit 12, 12 and shut-off valves 20 to be opened for permitting the air flow to fuel storage cylinders 10. Pressure reducing valves 21 decompress the compressed air coming from bottles 11 so that the air supplied to the storage cylinders is at atmospheric pressure. This decompression saves compressed air and assures engine operation under normal air pressure. Therefore, neither the conduits nor the storage cylinders need to be air-tight. The sudden decompression considerably cools the air, causing heat exchange with the heated Diesel oil flowing through heating coils 19. Thus, with twin suction conduit 12, 12 disconnected by flap valves 16 from the combustion chamber of engine 9, the decompressed air flows from fuel storage cylinders 10 into the engine combustion chamber for continued operation of the engine.

What is claimed is:

1. A work vehicle adapted for mobility along a track and for rescue work in underground or high-altitude sections in the atmosphere having alow oxygen-containing gas content, the vehicle being capable of carrying rescue personnel and being equipped with rescue apparatus, which comprises (a) an internal combustion engine for driving the vehicle, the engine operating with a fuel injected thereinto in admixture with an oxygen-containing gas of a higher oxygen content than said low oxygen-containing gas, (b) a suction conduit connected to the engine for supplying the oxygen-containing gas of a higher oxygen content to the engine from an ambient atmosphere consisting of said oxygen-containing gas of a higher oxygen content, (c) a supply of the oxygen-containing gas of a higher oxygen content in a compressed state carried on the vehicle, (d) a conduit means connecting said supply to the engine for supplying the oxygen-containing gas of a higher oxygen content to the engine, (e) switching means for selectively interrupting the flow of the oxygen-containing gas from the ambient atmosphere when the oxygen-containing gas of higher oxygen content is supplied through the conduit means and for interrupting the flow of oxygen-containing gas through the conduit means when the oxygen-containing gas from the ambient atmosphere flows to the engine through the suction conduit, the swithching means comprising (1) a flap valve in the suction conduit and
(2) a solenoid shut-off valve in the conduit means, and (f) an instrument for measuring the oxygen content of the ambient atmosphere, the instrument emitting a switching control signal indicating when the ambient atmosphere has said low oxygen-containing gas content and the control signal operating the switching means for interrupting the gas flow to the engine from the ambient atmosphere and permitting the gas flow to the engine from the supply of the oxygen-containing gas of a higher oxygen content.

2. The work vehicle of claim 1 wherein the engine is a Diesel motor.

3. The work vehicle of claim 1 wherein the supply of compressed oxygen-containing gas is comprised of a plurality of bottles containing compressed air under a pressure of about 200 bars.

4. The work vehicle of claim 1, wherein the engine comprises two storage cylinders for fuel and a heating coil being arranged in each one of the storage cylinders.

5. The work vehicle of claim 1, wherein the conduit means comprises a respective connecting conduit connecting a respective one of the suction conduits to a respective one of the storage cylinders and a respective pressure conduit connecting the supply of compressed oxygen-containing gas to a respective one of the storage cylinders, a gas pressure reducing valve being arranged in each one of the pressure conduits, and a respective solenoid shut-off valve in each pressure conduit for interrupting the flow of the oxygen-containing gas from the pressure conduit to the storage cylinder.

6. The work vehicle of claim 5, wherein the flap valve in the respective suction conduit is pivotal between positions respectively permitting and interrupting the flow of the ambient oxygen-containing gas to the engine, and further comprising a cylinder-piston device connected to the flap valve for pivoting the valve, and a solenoid valve for operating the cylinder-piston device.

7. The work vehicle of claim 6, wherein said control signal operates the solenoid valves.

* * * * *